(12) United States Patent
Suzuki et al.

(10) Patent No.: US 11,669,068 B2
(45) Date of Patent: Jun. 6, 2023

(54) DIAGNOSTIC DEVICE, DIAGNOSTIC METHOD, AND RECORDING MEDIUM

(71) Applicant: Mitsubishi Electric Corporation, Tokyo (JP)

(72) Inventors: Kyohei Suzuki, Tokyo (JP); Tetsushi Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/907,974

(22) PCT Filed: Jul. 10, 2020

(86) PCT No.: PCT/JP2020/027135
§ 371 (c)(1),
(2) Date: Aug. 30, 2022

(87) PCT Pub. No.: WO2022/009434
PCT Pub. Date: Jan. 13, 2022

(65) Prior Publication Data
US 2023/0011992 A1 Jan. 12, 2023

(51) Int. Cl.
*G05B 19/4065* (2006.01)
(52) U.S. Cl.
CPC ........... *G05B 19/4065* (2013.01); *G05B 2219/50276* (2013.01)
(58) Field of Classification Search
CPC ................. G05B 19/4065; G05B 15/02
See application file for complete search history.

(56) References Cited

U.S. PATENT DOCUMENTS 4,420,685 A * 12/1983 Ohtani ............... B23Q 17/0957
250/222.2
4,918,427 A * 4/1990 Thomas ............... G08B 21/187
73/104

(Continued)

FOREIGN PATENT DOCUMENTS

JP 5-337790 A 12/1993
JP 2000317710 A * 11/2000 ............. B23B 49/00

(Continued)

OTHER PUBLICATIONS

International Search Report and Written Opinion dated Sep. 8, 2020, received for PCT Application PCT/JP2020/027135, filed on Jul. 10, 2020, 10 pages including English Translation.

(Continued)

*Primary Examiner* — Ronald D Hartman, Jr.
(74) *Attorney, Agent, or Firm* — Xsensus LLP

(57) ABSTRACT

A diagnostic apparatus (10) diagnoses the existence of an abnormality in a tool for processing of a processing target by each of multiple working machines. The diagnostic apparatus (10) includes an acquirer (110) and a diagnoser (160). The acquirer (110) acquires program identification information identifying a program executed in each of the working machines, tool information indicating a type of the tool applied to processing, and transition information indicating transition of load in the working machine from the start to the end of the processing executed by execution of the program, at execution of the processing in the working machine. The diagnoser (160) diagnoses whether an index value of the load obtained from the transition information is out of a predetermined range corresponding to a combination of the program identification information, the tool information, and machine information identifying the working machine that transmits the transition information.

7 Claims, 12 Drawing Sheets

(56) References Cited

U.S. PATENT DOCUMENTS

| | | | | |
|---|---|---|---|---|
| 5,251,144 | A | * | 10/1993 | Ramamurthi ...... G05B 19/4065 706/904 |
| 5,921,726 | A | * | 7/1999 | Shiozaki ................ B23Q 1/70 408/6 |
| 7,503,691 | B2 | * | 3/2009 | Kojima ................ B23Q 17/22 374/45 |
| 2004/0153259 | A1 | * | 8/2004 | Lee .................... B23Q 17/0961 702/34 |
| 2004/0217873 | A1 | * | 11/2004 | Schweitzer ........ G05B 19/4065 340/680 |
| 2012/0109539 | A1 | * | 5/2012 | Hasegawa ............ F16C 19/522 702/34 |
| 2013/0253670 | A1 | | 9/2013 | Chung et al. |
| 2017/0139398 | A1 | | 5/2017 | Tsuzuki et al. |
| 2020/0061768 | A1 | | 2/2020 | Morita et al. |
| 2021/0132578 | A1 | * | 5/2021 | Yabune ................ G06N 20/00 |
| 2021/0229231 | A1 | | 7/2021 | Fukatsu et al. |

FOREIGN PATENT DOCUMENTS

| | | | | |
|---|---|---|---|---|
| JP | 2005-22052 | A | | 1/2005 |
| JP | 2006-205289 | A | | 8/2006 |
| JP | 2017-24112 | A | | 2/2017 |
| JP | 2017-97839 | A | | 6/2017 |
| JP | 2017-205826 | A | | 11/2017 |
| JP | 2018-176329 | A | | 11/2018 |
| JP | 2020-60417 | A | | 4/2020 |
| JP | 2020-62737 | A | | 4/2020 |
| KR | 20060075304 | | * 7/2006 | ............ B23Q 15/12 |
| WO | 2018/105175 | A1 | | 6/2018 |
| WO | 2019/239606 | A1 | | 12/2019 |

OTHER PUBLICATIONS

Decision to Grant dated Jan. 12, 2021, received for JP Application 2020-564962, 5 pages including English Translation.

* cited by examiner

FIG.5

| | | 121 | | |
|---|---|---|---|---|
| MODEL STORAGE ||||||
| MODEL NUMBER | MODEL NAME | MACHINE ID | SUBPROGRAM ID | TOOL ID |
| 1 | MODEL1 | M1 | P1234 | T1 |
| 2 | MODEL2 | M1 | P2345 | T1 |
| 3 | MODEL3 | M1 | P3456 | T1 |
| 4 | MODEL4 | M1 | P1234 | T2 |
| 5 | MODEL5 | M1 | P2345 | T2 |
| 6 | MODEL6 | M2 | P1234 | T1 |
| 7 | MODEL7 | M2 | P2345 | T1 |
| 8 | MODEL8 | M2 | P3456 | T1 |
| 9 | MODEL9 | M2 | P1234 | T2 |
| 10 | MODEL10 | M2 | P2345 | T2 |
| 11 | ⋮ | ⋮ | ⋮ | ⋮ |
| 12 | ⋮ | ⋮ | ⋮ | ⋮ |

FIG.6

| MODEL NUMBER | INDEX VALUE (AVERAGE LOAD) | DATE, TIME |
|---|---|---|
| | HISTORY STORAGE 131 | |
| 1 | 1270 | JULY 1, 13:26:54 |
| | 1284 | JULY 1, 13:28:00 |
| | ⋮ | ⋮ |
| 2 | 2134 | JULY 1, 14:02:33 |
| | 2155 | JULY 1, 14:03:44 |
| | ⋮ | ⋮ |
| ⋮ | ⋮ | ⋮ |

FIG.8

| THRESHOLD STORAGE 151 ||
|---|---|
| MODEL NUMBER | THRESHOLD |
| 1 | 1350 |
| 2 | 2340 |
| ⋮ | ⋮ |

DIAGNOSTIC DEVICE, DIAGNOSTIC METHOD, AND RECORDING MEDIUM

CROSS-REFERENCE TO RELATED APPLICATION

The present application is based on PCT filing PCT/JP2020/027135, filed Jul. 10, 2020, the entire contents of which are incorporated herein by reference.

TECHNICAL FIELD

The present disclosure relates to a diagnostic apparatus, a diagnostic method, and a program.

BACKGROUND ART

Working machines are known that execute various types of processing, represented by cutting of metal objects, using tools. In order to prevent a defective product from being generated due to abrasion or breakage of a tool in this type of working machines, replacing tools that have been used to some extent before generation of a defective product is preferable. However, an exemplary system, in which tools are replaced based on the number of executed times of processing regardless of the actual statuses of the tools, may lead to disposal of tools that are still useful and unnecessary replacements.

In view of these problems, techniques for detecting an abnormality in tools in working machines are proposed (for example, refer to Patent Literature 1). The tool abnormality detecting apparatus disclosed in Patent Literature 1 determines an abnormality by comparing the load in processing with threshold data for determining the remaining lives of tools. The apparatus can thus determine the existence of an abnormality depending on the load in the processing.

CITATION LIST

Patent Literature

Patent Literature 1: Unexamined Japanese Patent Application Publication No. H5-337790

SUMMARY OF INVENTION

Technical Problem

The apparatus disclosed in Patent Literature 1 detects a load on a single working machine. In a field provided with multiple working machines, this apparatus can also determine the existence of an abnormality in tools installed in each of the working machines, if the target of determination of the existence of an abnormality is switched among the working machines. However, different working machines do not necessarily receive the same load in general, despite of the identical tool and the identical processing step. A user is thus required to set data corresponding to the working machine after every switching of the determination target among the working machines, and may suffer from a complicated operation to monitor the statuses of the tools in the working machines.

The present disclosure is made in view of the above situations, and an objective of the present disclosure is to simplify the setting operation to monitor the statuses of the tools in the working machines.

Solution to Problem

In order to achieve the above objective, a diagnostic apparatus according to an aspect of the present disclosure diagnoses the existence of an abnormality in a tool for processing of a processing target by each of a plurality of working machines. The diagnostic apparatus includes: acquisition means for acquiring, at execution of processing by each of the plurality of working machines, (i) program identification information identifying a program executed in the working machine, (ii) tool information indicating a type of the tool applied to the processing, and (iii) transition information indicating transition of load in the working machine from the start to the end of the processing executed by execution of the program; and diagnostic means for diagnosing whether an index value of the load that is obtained from the transition information is out of a predetermined range corresponding to a combination of the program identification information, the tool information, and machine information identifying the working machine that transmits the transition information.

Advantageous Effects of Invention

According to an aspect of the present disclosure, the diagnostic means diagnoses whether the index value of the load is out of the predetermined range corresponding to the combination of the program identification information, the tool information, and the machine information identifying the working machine. The diagnostic means can thus execute diagnosis suitable for each of the plurality of working machines. This configuration can therefore simplify the setting operation to monitor the statuses of the tools in the plurality of working machines.

BRIEF DESCRIPTION OF DRAWINGS

FIG. 5 illustrates an example of data stored in a model storage according to Embodiment 1;

FIG. 6 illustrates an example of data stored in a history storage according to Embodiment 1;

FIG. 8 illustrates an example of data stored in a threshold storage according to Embodiment 1;

DESCRIPTION OF EMBODIMENTS

A diagnostic system 100 according to embodiments of the present disclosure is described in detail below with reference to the accompanying drawings.

Embodiment 1

Figure 1:
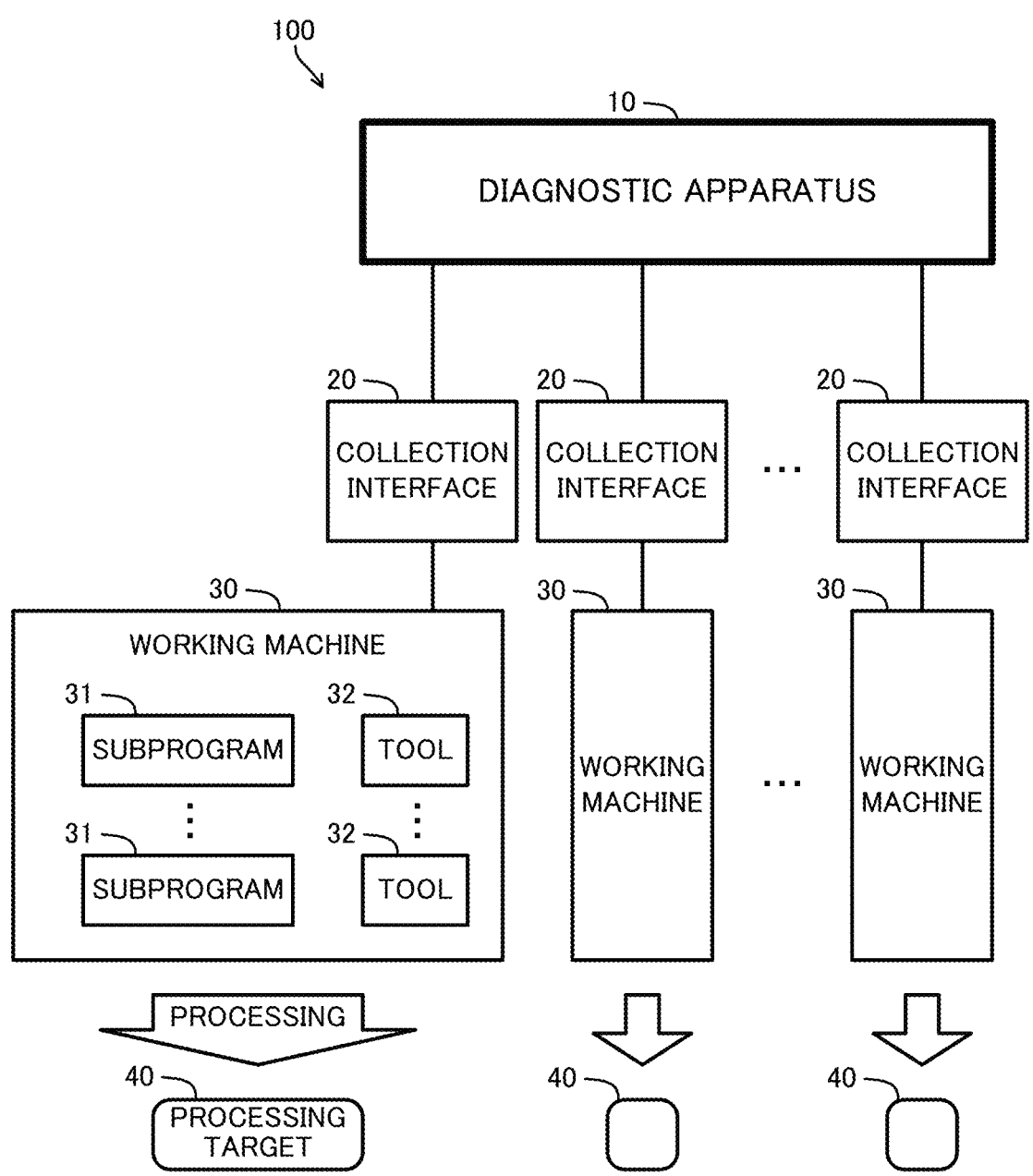
FIG. 1 illustrates a configuration of a diagnostic system according to Embodiment 1.

As illustrated in FIG. 1, the diagnostic system 100 according to this embodiment diagnoses the existence of an abnormality in tools 32 installed in each of multiple working machines 30. In the case of detection of an abnormality in any tool, the diagnostic system 100 prompts a user monitoring the statuses of the tools to replace the tool. The diagnostic system 100 includes a diagnostic apparatus 10 to diagnose the existence of an abnormality, multiple collection interfaces 20 via which the diagnostic apparatus 10 collects information from the individual working machines 30, and the working machines 30.

Each of the working machines 30 is a machining center or a turning center to execute computerized numerical control (CNC) processing, for example. The working machine 30 preliminarily stores multiple subprograms 31, and preliminarily accommodates multiple tools 32. The working machine 30 executes a single subprogram 31 designated by the outside among the multiple subprograms 31 and thereby selects any one tool 32 among the multiple tools 32, and then processes a workpiece, which is a processing target 40, using the selected tool.

Each of the subprograms 31 is a processing program represented by a numerical control (NC) program written in G code, for example. The subprogram 31 is called and executed from the main program of the working machine 30 at execution of processing by the working machine 30. The multiple subprograms 31 are deigned to achieve different processing steps. The different processing steps achieved by the subprograms 31 may be cutting steps providing mutually different shapes to the processing target 40, cutting steps providing the identical shape with mutually different processing accuracies, or a cutting step and another processing step, for example.

Each of the tools 32 is an end mill, a face mill, or a drill, for example. The multiple tools 32 may be end mills made of different materials and having different diameters, or a combination of an end mill and a drill, for example. Each of the tools 32 wears and deteriorates with repetitive use and is thus preferably replaced with another tool 32 of the same type until reaching the end of life. The type of the tool 32 corresponds to a type number or a product number. When the tool 32 is replaced with another tool 32 of the same type, execution of the subprogram 31 identical to that before the replacement achieves the processing step equivalent to that before the replacement. An abnormality in the tool 32 diagnosed in the diagnostic system 100 may be an event that the tool 32 reaches the end of life, a state that the tool 32 needs to be replaced before reaching the end of life, or a state that preparation of another tool 32 of the same type as the currently applied tool 32 is recommended.

The diagnostic apparatus 10 is an industrial personal computer (IPC) or a programmable logic controller (PLC), for example. The diagnostic apparatus 10 may be a controller to control the multiple working machines 30, or a computer to diagnose the statuses of the tools 32 without controlling the working machines 30. The diagnostic apparatus 10 collects information, which is described below, from the working machines 30 via the collection interfaces 20.

Each of the collection interfaces 20 may be an adaptor mounted in the working machine 30 to communicate with the diagnostic apparatus 10, or a function achieved in at least either of the diagnostic apparatus 10 and the working machine 30 through execution of software.

Figure 2:
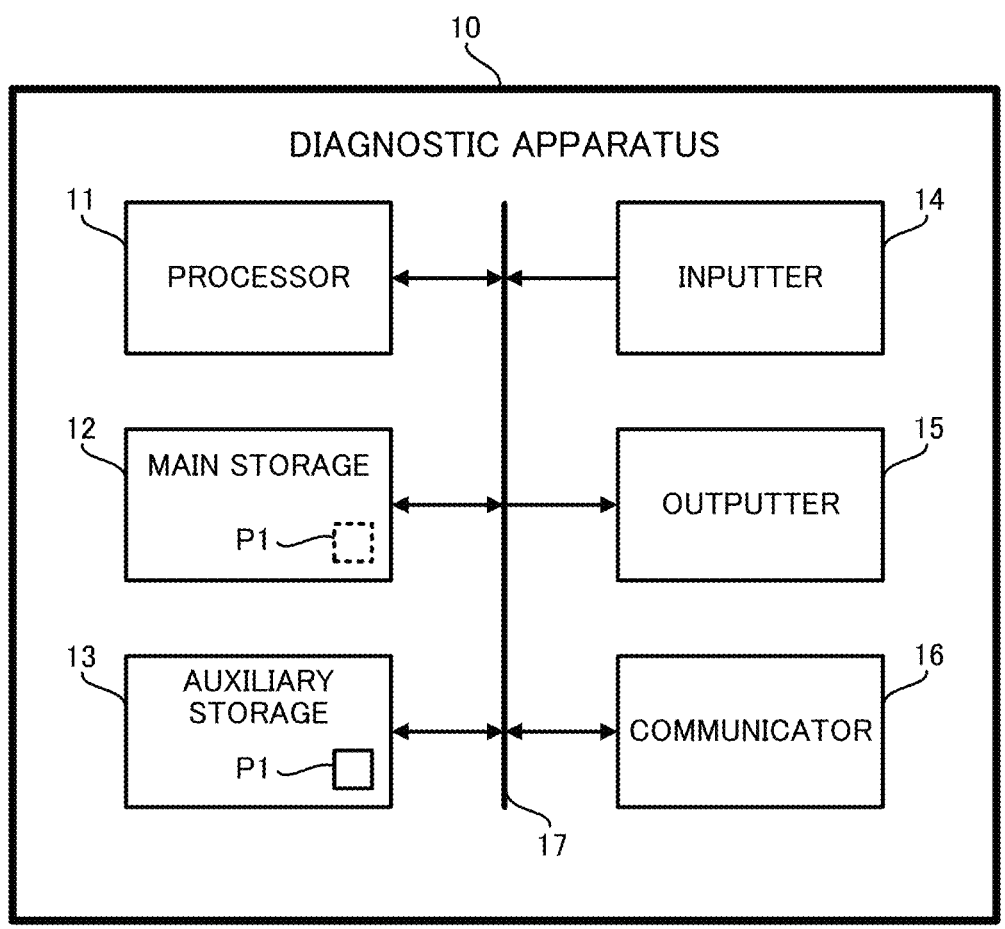
FIG. 2 illustrates a hardware configuration of a diagnostic apparatus according to Embodiment 1.

FIG. 2 illustrates a hardware configuration of the diagnostic apparatus 10. As illustrated in FIG. 2, the diagnostic apparatus 10 includes a processor 11, a main storage 12, an auxiliary storage 13, an inputter 14, an outputter 15, and a communicator 16. The main storage 12, the auxiliary storage 13, the inputter 14, the outputter 15, and the communicator 16 are each connected to the processor 11 via internal buses 17.

The processor 11 includes a central processing unit (CPU) or a micro processing unit (MPU). The processor 11 executes a program P1 stored in the auxiliary storage 13 and thereby performs functions described below.

The main storage 12 includes a random access memory (RAM). The program P1 is loaded from the auxiliary storage 13 into the main storage 12. The main storage 12 serves as a work area of the processor 11.

The auxiliary storage 13 includes a non-volatile memory, represented by an electrically erasable programmable read-only memory (EEPROM). The auxiliary storage 13 stores the program P1 and various types of data used in processes in the processor 11. The auxiliary storage 13 provides the processor 11 with data to be used by the processor 11 and stores data fed from the processor 11 under the instructions from the processor 11.

The inputter 14 includes an input device, represented by an input key and a DIP switch. The inputter 14 acquires information input by the user of the diagnostic apparatus 10 and outputs the acquired information to the processor 11.

The outputter 15 includes an output device, represented by a light emitting diode (LED) and a liquid crystal display (LCD). The outputter 15 presents various types of information to the user under the instructions from the processor 11.

The communicator 16 includes a network interface circuit to communicate with external apparatuses. The communicator 16 receives signals from the outside and outputs information indicated by the signals to the processor 11. The communicator 16 also transmits signals indicating the information output from the processor 11 to external apparatuses.

Figure 3:
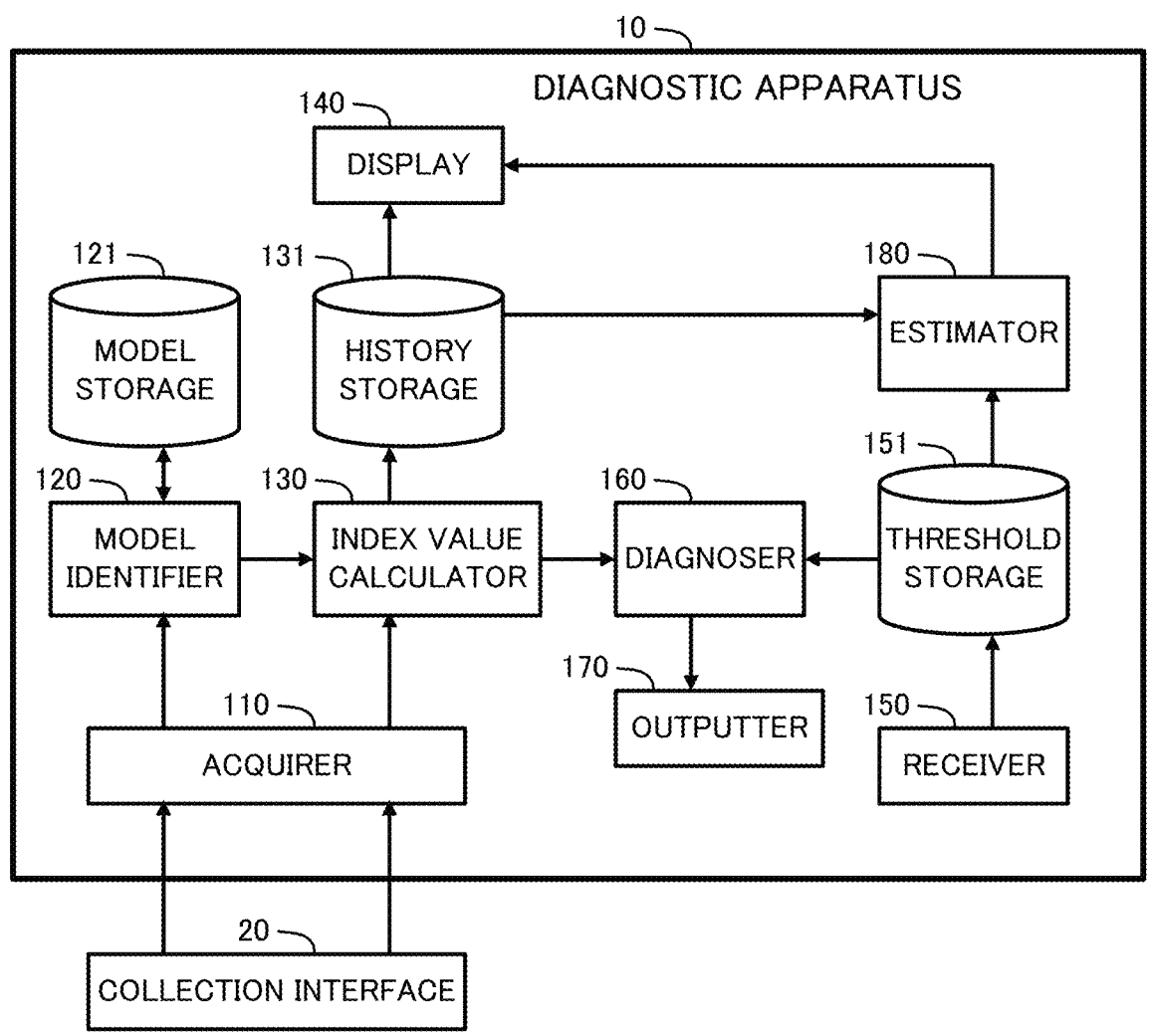
FIG. 3 illustrates a functional configuration of the diagnostic apparatus according to Embodiment 1.

The above-described hardware components cooperate with each other and thereby allow the diagnostic apparatus 10 to perform various functions. FIG. 3 illustrates a functional configuration of the diagnostic apparatus 10. As illustrated in FIG. 3, the diagnostic apparatus 10 includes an acquirer 110 to acquire information from the working machines 30, a model identifier 120 to identify a model to be diagnosed in the diagnostic apparatus 10, a model storage 121 to store information on models, an index value calculator 130 to calculate an index value of the load in processing executed by the working machine 30, a history storage 131 to store histories of the calculated index values, a display 140 to display a history of the index value, a receiver 150 to receive a threshold determined for each model from the user, a threshold storage 151 to store the received thresholds, a diagnoser 160 to diagnose the existence of an abnormality in the tool 32 based on comparison between the index value and the threshold, an outputter 170 to output a diagnosis result, and an estimator 180 to estimate how many more times the tool 32 can execute the processing until reaching the end of life based on the history of the index value.

The acquirer 110 is mainly achieved by cooperation of the processor 11 and the communicator 16. The acquirer 110 acquires transition information indicating transition of the load in the working machine 30 executing the processing, and processing condition information indicating conditions of the processing executed in the working machine 30, from the working machine 30 executing the processing step via the collection interface 20.

The transition information is chronological data indicating transition of a current flowing in a motor included in the working machine 30 or transition of a power consumption at the motor in single processing. The motor is related to the processing and may be the motor of a main shaft for rotating the tool 32 or the motor of a feed shaft for shifting a table on which the processing target 40 is fixed. When the tool 32 wears, the working machine 30 increases the output of the motor to execute the processing step specified in the subprogram 31. As the tool 32 wears, the motor receives more load. The acquirer 110 may acquire values of load on the motor from the working machine 30 in real time from the start to the end of the processing, or may acquire data indicating transition of the load on the motor after completion of the processing.

Figure 4:
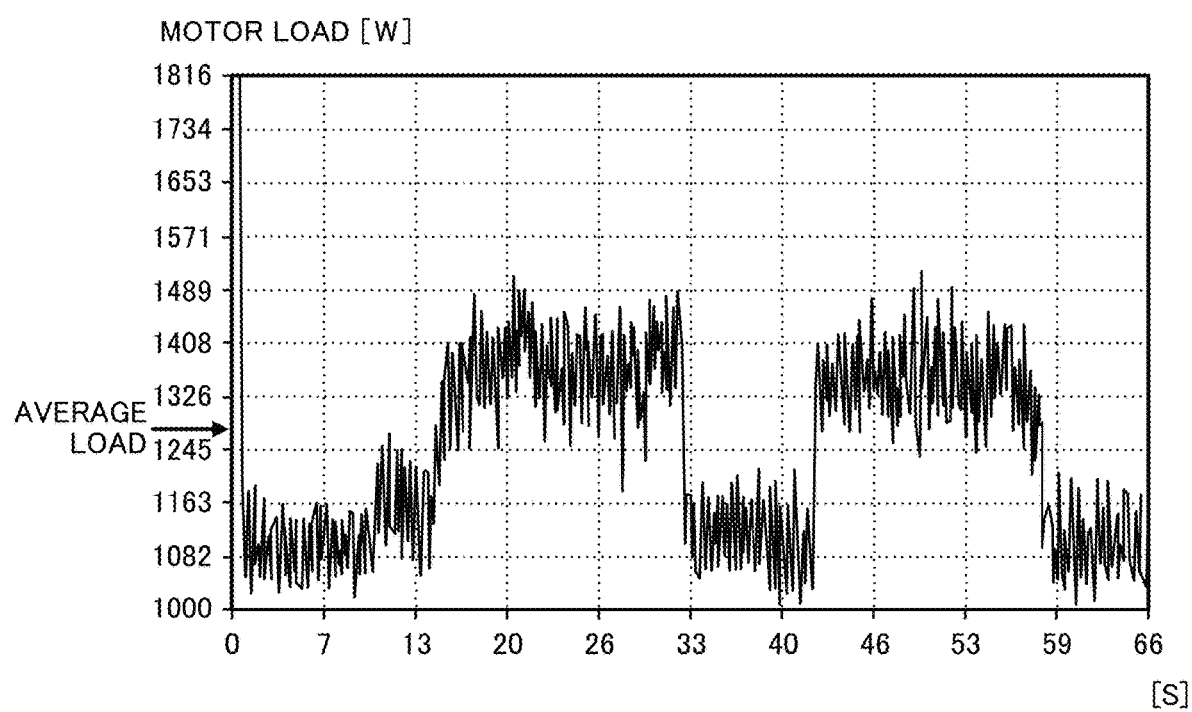
FIG. 4 illustrates an example of transition information according to Embodiment 1.

FIG. 4 illustrates an example of transition information. As in the example illustrated in FIG. 4, the load on the motor varies mainly depending on the state of contact between the tool 32 and the processing target 40, from 0 seconds corresponding to the start of processing until 66 seconds corresponding to the end of the processing.

The processing condition information contains a machine ID identifying one working machine 30 from the other working machines 30, a subprogram ID identifying one subprogram 31 executed to achieve the processing step from the other subprograms 31, and a tool ID indicating the type of the tool applied to the processing.

The machine ID may be the number preliminarily assigned to the working machine 30 and stored in the working machine 30 itself, or the address of the working machine 30 in the diagnostic system configured as a factory automation (FA) network.

The subprogram ID may be the name of the subprogram 31 or a hash value calculated from codes of the subprogram 31. The identical subprograms 31 stored in mutually different working machines 30 may have the identical subprogram ID or different subprogram IDs. The subprogram ID is at least required to identify one subprogram 31 stored in a certain working machine 30 from the other subprograms 31 stored in this working machine 30.

The tool ID is a type number or a product number of the tool 32, but these numbers are mere example. The tool ID is only required to identify tools 32 of a certain type from tools 32 of the other types. The tool ID is at least required to identify one tool 32 accommodated in a certain working machine 30 from the other tools 32 accommodated in this working machine 30.

The processing step corresponding to a combination of the machine ID, the subprogram ID, and the tool ID is repetitively executed in general. The tool 32 identified by the tool ID is expected to wear in every execution of the processing step. The combination of the machine ID, the subprogram ID, and the tool ID therefore serves as an effective parameter to determine the status of the tool 32. The diagnostic apparatus 10 manages these combinations of information as models, which are described below.

Each of the machine ID, the subprogram ID, and the tool ID may also be any number determined by the user. In the case where the diagnostic apparatus 10 preliminarily stores the machine IDs of the respective working machines 30, the acquirer 110 may skip acquisition of the machine IDs. Alternatively, the acquirer 110 may acquire the machine IDs from a device other than the working machines 30. The acquirer 110 corresponds to an example of acquisition means, in the diagnostic apparatus 10, for acquiring the subprogram ID as program identification information, the tool ID as tool information, and the transition information at execution of the processing by each of the working machines 30. The program identification information identifies a program executed in the working machine 30. The tool information indicates a type of a tool applied to the processing. The transition information indicates transition of load in the working machine 30 from the start to the end of the processing executed by execution of the program.

The model identifier 120 is mainly achieved by the processor 11. The model identifier 120 acquires the processing condition information transmitted from each of the working machines 30 via the acquirer 110. The model identifier 120 then identifies the model defined by the combination of the machine ID, the subprogram ID, and the tool ID contained in the acquired processing condition information, among the models stored in the model storage 121. When no model corresponding to the acquired processing condition information is stored in the model storage 121, the model identifier 120 identifies this model as a new model and registers the model in the model storage 121. The model identifier 120 then outputs information indicating the identified model to the index value calculator 130.

The model storage 121 is mainly achieved by the auxiliary storage 13. The model storage 121 stores multiple models defined by combinations of the machine IDs, the subprogram IDs, and the tool IDs. FIG. 5 illustrates an example of data stored in the model storage 121. In the example illustrated in FIG. 5, the model storage 121 stores the model number assigned to the model, the model name, the machine ID, the subprogram ID, and the tool ID in association with each other for each model.

The index value calculator 130 is mainly achieved by the processor 11. The index value calculator 130 acquires the transition information transmitted from each of the working machines 30 via the acquirer 110. The index value calculator 130 then calculates an index value, which is a statistic indicating an amount of load from the start to the end of the processing. In detail, the index value calculator 130 calculates an average of the load as the index value, but this configuration is a mere example. The index value calculator 130 may also calculate a median value, maximum value, or minimum value of the load as the index value. The average of the load calculated in the index value calculator 130 is hereinafter referred to as "average load" as appropriate. When acquiring the transition information in the example illustrated in FIG. 4, the index value calculator 130 calculates an average load and thus obtains a value of 1,270.

The index value calculator 130 also causes the calculated index value to be stored into the history storage 131 as the index value calculated for the model output from the model identifier 120, in association with this model. The index value calculator 130 then provides the diagnoser 160 with the calculated index value as well as the model output from the model identifier 120.

The history storage 131 is mainly achieved by the auxiliary storage 13. The history storage 131 stores a history of the index value for each model. FIG. 6 illustrates an example of data stored in the history storage 131. In the example illustrated in FIG. 6, the history storage 131 stores a model number of each model, index values calculated for this model, and dates and times of calculation of the index values in association with each other. When the accumulated history exceeds a predetermined amount, the history storage 131 may delete the older part of the history exceeding the predetermined amount in the chronological order. The predetermined amount may be a predetermined amount of data, or an amount of data containing twice or more replacements of the tool, for example. The history storage 131 corresponds to an example of storage means, in the diagnostic apparatus 10, for storing, for each of models that each are defined by a combination of the subprogram ID as the program identification information, the tool ID as the tool information, and the machine ID as the machine information identifying the working machine that transmits the transition information, a history of the index value for the model that contains a plurality of the index values for the model.

The display 140 is mainly achieved by the outputter 15. In response to a manipulation of the user, the display 140 reads a history of the index value from the history storage 131 and displays a graph illustrating transition of the index values. In detail, the display 140 reads a history of the index value for the model designated by the manipulation of the user and displays a line graph as in the example illustrated in FIG. 7.

Figure 7:
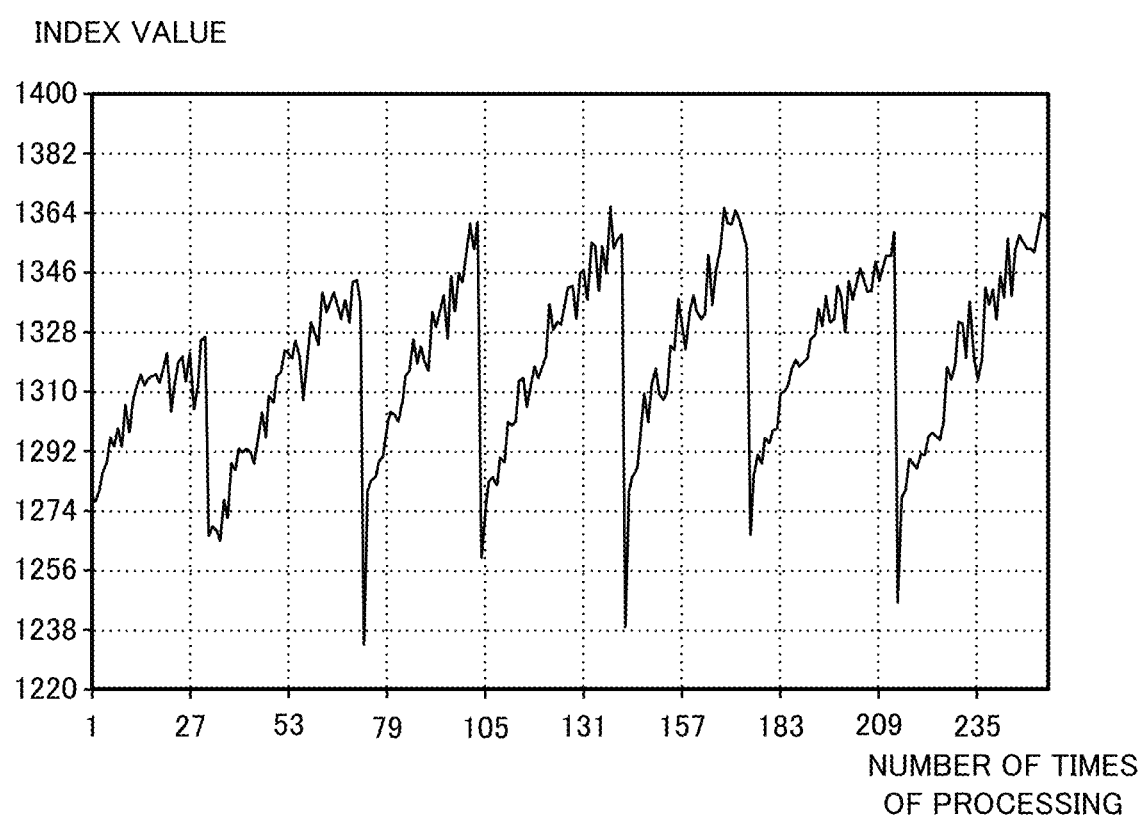
FIG. 7 is a graph illustrating an exemplary history of an index value according to Embodiment 1.

The exemplary graph illustrated in FIG. 7 is made of multiple waves each containing a gradual rise and a sudden drop in the index value. The gradual rise in the index value indicates an increase in the average load due to abrasion of the tool 32. The sudden drop in the index value indicates a decrease in the index value of the load due to replacement of the tool 32 that allows the tool 32 to restore the initial processing performance.

That is, the graph illustrated in FIG. 7 illustrates a history of the index value calculated for seven tools 32 of the same type subject to six replacements. FIG. 7 reveals that even the tools 32 of the same type have individual differences, resulting in different index values calculated immediately after replacements. The index value does not always monotonically rise but tends to generally increase with fluctuations. Accordingly, the history of the index value arranged in the order of execution of the processing steps corresponding to the model, that is, in the chronological order is regarded as trend data indicating the status of the tool 32.

Referring back to FIG. 3, the receiver 150 is mainly achieved by cooperation of the processor 11 and the inputter 14. The receiver 150 receives a threshold for each model input from the user and causes the received threshold data to be stored into the threshold storage 151. The user determines this threshold preferably based on the history of the index value displayed on the display 140 because the threshold is used in diagnosis of each model in the diagnoser 160.

The threshold storage 151 is mainly achieved by the auxiliary storage 13. The threshold storage 151 stores the threshold for each model. FIG. 8 illustrates an example of data stored in the threshold storage 151. In the example illustrated in FIG. 8, the threshold storage 151 stores the model numbers and the thresholds in association with each other.

The diagnoser 160 is mainly achieved by the processor 11. The diagnoser 160 determines whether the index value calculated in the index value calculator 130 exceeds the threshold for the model corresponding to the index value. In detail, the diagnoser 160 acquires the index value output from the index value calculator 130 and reads the threshold, corresponding to the model output as well as this index value in the threshold storage 151, from the threshold storage 151. The diagnoser 160 then determines whether the acquired index value exceeds the read threshold and thereby diagnoses the existence of an abnormality in the tool 32. The diagnoser 160 outputs a diagnosis result to the outputter 170. Alternatively, the diagnoser 160 may output a diagnosis result when detecting an abnormality in the tool 32 and may output no diagnosis result when detecting no abnormality in the tool 32.

The outputter 170 is mainly achieved by the outputter 15. The outputter 170 notifies the user of the diagnosis result output from the diagnoser 160. The diagnosis result may be notified from the outputter 170 by displaying an alert message for prompting replacement because of an abnormality in the tool, providing continuous or intermittent illumination of the LED, or generating a buzz. Alternatively, the outputter 170 may be achieved by the communicator 16 and may transmit the diagnosis result to an external apparatus by means of communication.

Figure 9:
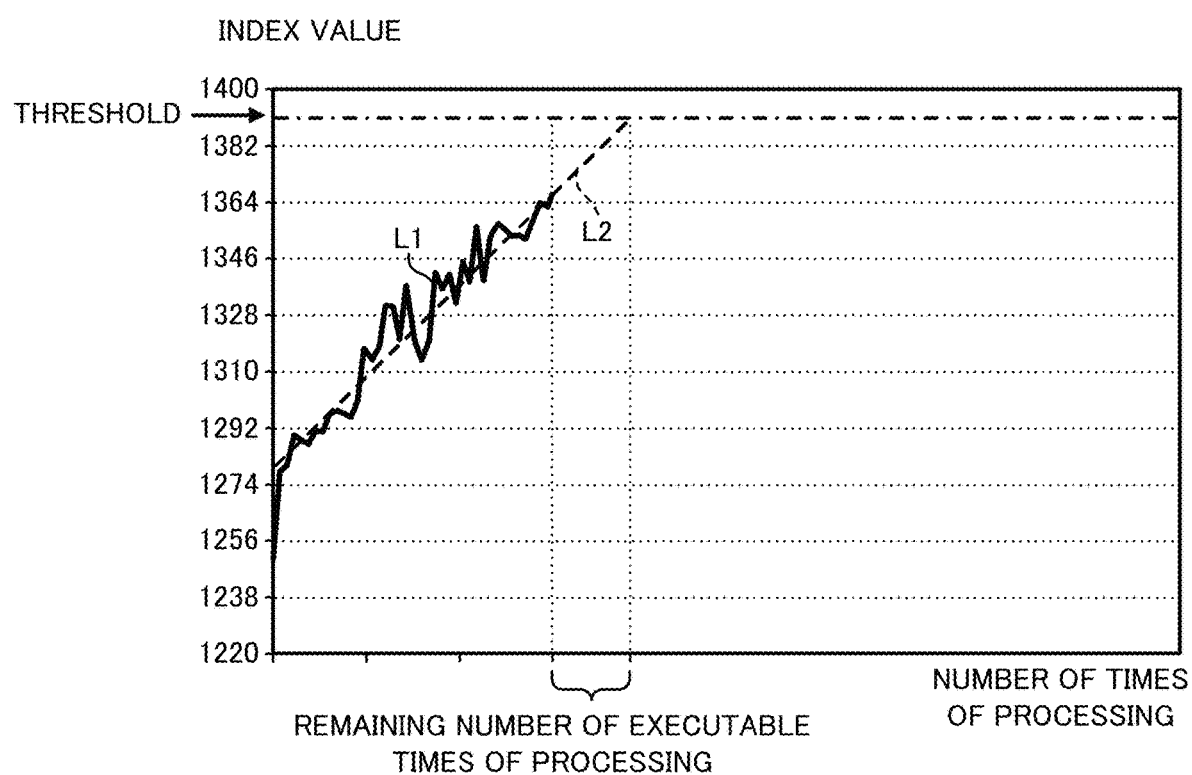
FIG. 9 is a diagram for describing estimation at an estimator according to Embodiment 1.

The estimator 180 is mainly achieved by the processor 11. The estimator 180 reads the history of the index value for a certain model from the history storage 131, and estimates how many more times the processing can be executed until an index value to be calculated in the index value calculator 130 in the future reaches the threshold stored in the threshold storage 151. The estimator 180 may perform estimation for one or more models designated by the user in response to a manipulation of the user, or perform estimation for the model designated by the diagnoser 160 at every diagnosis in the diagnoser 160. For example, the estimator 180 refers to the history of the index value after a replacement of the tool 32 like the history represented by the line L1 in FIG. 9 and thus obtains the dashed regression line L2, and then calculates the remaining number of executable times of processing until the regression line L2 reaches the threshold. The estimator 180 then outputs an estimation result to the display 140. The estimation result output to the display 140 is displayed on a screen so as to inform the user of an expected timing of the subsequent replacement of the tool 32. The estimation result presented to the user may be the graph like that illustrated in FIG. 9 or the numerical value indicating the remaining number of executable times of processing.

The estimator 180 may also output the estimation result to the diagnoser 160 or the outputter 170, and inform the user of the estimation result output from the estimator 180 together with the diagnosis result output from the diagnoser 160.

Figure 10:
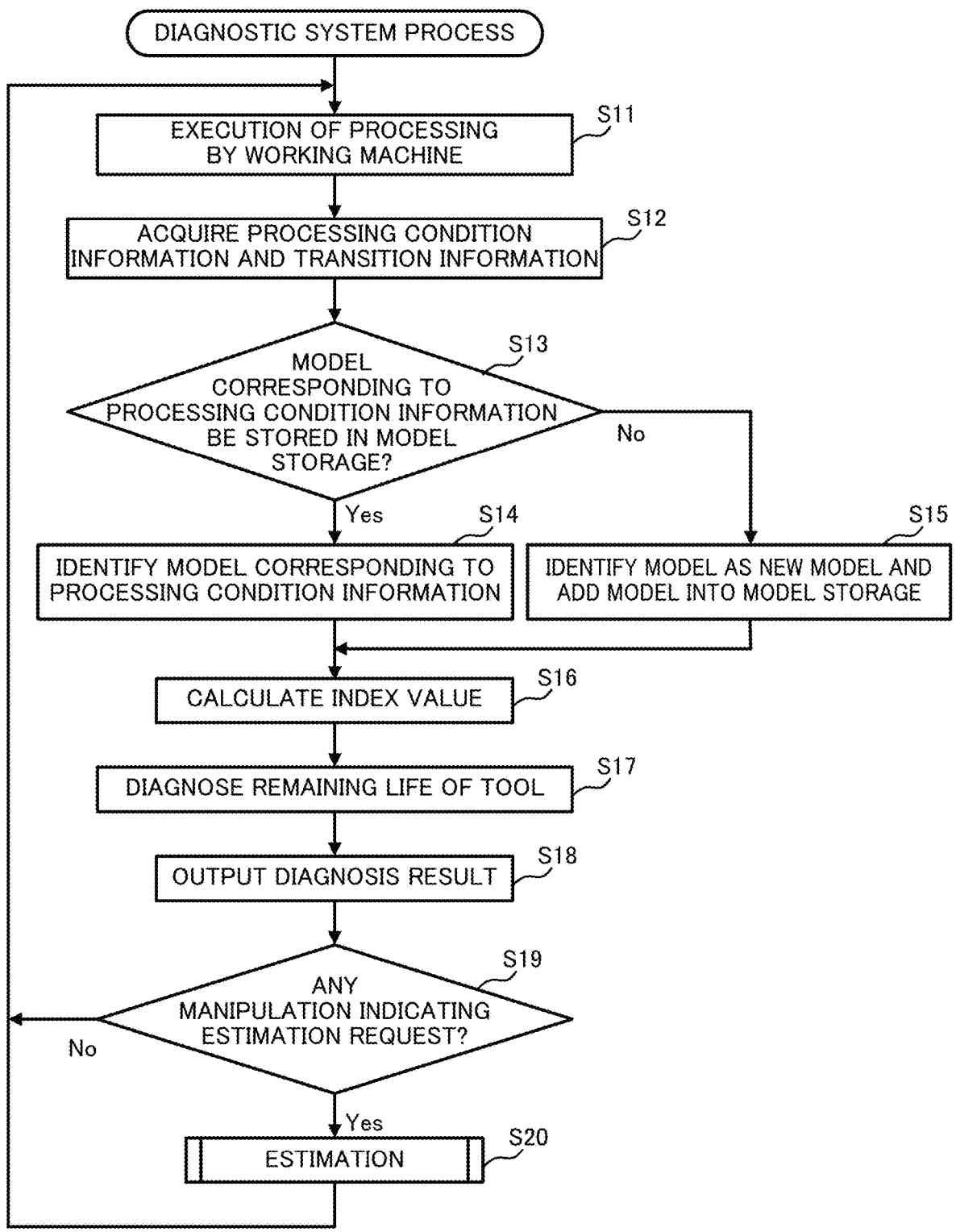
FIG. 10 is a flowchart illustrating a diagnostic system process according to Embodiment 1.

The process executed in the diagnostic system 100 is described below with reference to FIG. 10. FIG. 10 illustrates an exemplary diagnostic system process executed in the diagnostic system 100.

In the diagnostic system process, when the working machine 30 executes the processing step (Step S11), the acquirer 110 acquires processing condition information containing the machine ID, the subprogram ID, and the tool ID corresponding to the processing step executed in Step S11, and transition information indicating transition of the load in the working machine 30 in the processing step executed in Step S11 (Step S12). Step S12 corresponds to the step, in the diagnostic method executed in the diagnostic apparatus 10, of acquiring the program identification information, the tool information, and the transition information at execution of the processing by each of the working machines.

The model identifier 120 then determines whether a model corresponding to the processing condition information acquired in Step S12 is stored in the model storage 121 (Step S13). Specifically, the model identifier 120 determines whether the model number and model name are assigned to the combination of the machine ID, the subprogram ID, and the tool ID contained in the processing condition information acquired in Step S12.

When determining that the model is stored in Step S13 (Step S13; Yes), the model identifier 120 identifies the model corresponding to the processing condition information (Step S14). Specifically, the model identifier 120 reads the model number of the model corresponding to the processing condition information from the model storage 121.

In contrast, when determining that no model is stored in Step S13 (Step S13: No), the model identifier 120 identifies the model corresponding to the processing condition information as a new model, and adds the model into the model storage 121 (Step S15). Specifically, the model identifier 120 generates a new model containing the processing conditions based on the model format. More specifically, the model identifier 120 forms a record by associating the combination of the machine ID, the subprogram ID, and the tool ID contained in the processing condition information with a new model number and a new model name, and adds the record into the model storage 121. The new model number and the new model name may be assigned by the model identifier 120 in accordance with predetermined rules, or may be input from the user who is prompted to input the information.

After Steps S14 and S15, the index value calculator 130 calculates an average load as the index value, from the transition information acquired in Step S12 (Step S16). The index value calculator 130 may calculate the index value after excluding parts of the transition of the load within certain periods immediately after the start of the processing and immediately before the end of the processing. The index value calculator 130 may also calculate the index value from a substantial processing load obtained by subtracting the offset value corresponding to the standby power consumption of the working machine 30, or may use the index value obtained by subtracting the offset value from the average of the load.

The diagnoser 160 then diagnoses the remaining life of the tool (Step S17). Specifically, the diagnoser 160 determines whether the index value calculated in Step S16 exceeds the predetermined threshold for the model identified in Step S14 or S15. In the case where the model is identified as a new model in Step S15 and a threshold has not yet been determined in association with this new model, the diagnoser 160 may prompt the user to determine a threshold, acquire the threshold from the user, and then diagnose the remaining life.

The outputter 170 then outputs a diagnosis result acquired in Step S17 (Step S18). Step S18 may be skipped in the case where the tool 32 is determined to have not yet reached the end of life in Step S17.

The estimator 180 then determines whether the user provides a manipulation indicating a request for estimation (Step S19). When the estimator 180 determines no manipulation (Step S19: No), Step S11 and the following steps are repeated.

In contrast, when the estimator 180 determines a manipulation (Step S19: Yes), the estimator 180 executes estimation (Step S20). Specifically, the estimator 180 estimates the remaining number of executable times of processing for the model identified in Step S14 based on the history of the index value, which is accumulated in the history storage 131 through repetition of Step S16, and causes the display 140 to display an estimation result. This step is followed by repetition of Step S11 and the following steps.

In the case were the amount of history accumulated in the history storage 131 is not sufficient for estimation, the estimator 180 may output an error message without estimating the remaining number of executable times of processing. The amount of history sufficient for estimation may be the index values calculated from ten times of processing following a replacement of the tool 32, for example. Alternatively, the estimator 180 may acquire multiple regression lines like that illustrated in FIG. 9 based on the history from the start of application of the tool 32 until the end due to replacement, and store the average of the gradients of the regression lines. In this case, when at least one index value is calculated for a currently applied tool 32, the estimator 180 is able to execute estimation based on the average of the gradients.

As described above, the diagnoser 160 determines whether the index value of the load is out of the predetermined range corresponding to the combination of the program identification information, the tool information, and the machine information identifying the working machine. The diagnoser 160 can thus execute diagnosis suitable for each of the working machines 30. Accordingly, when the target working machine 30 to be diagnosed in the diagnostic apparatus 10 is switched, the user does not have to set data suitable for the working machine 30 after the switching. In particular, a field provided with multiple working machines 30 often performs periodical inspections each involving sequential diagnostic processes for these working machines 30. Also in this case, the diagnostic apparatus 10 according to the embodiment does not require the user to change the data that has once been set for the respective working machines 30. The diagnostic apparatus 10 can therefore simplify the setting operation to monitor the statuses of the tools 32 in the working machines 30.

The estimator 180 estimates the remaining number of executable times of the processing step corresponding to the model using the tool 32 until the tool 32 reaches the end of life. This configuration can allow the user to prepare a spare tool 32 in anticipation of a future replacement timing of the currently applied tool 32, regardless of detection of an abnormality in the diagnoser 160.

The diagnostic apparatus 10 executes diagnosis and estimation based on the model uniquely defined by the machine ID, the subprogram ID, and the tool ID. In particular, the model for diagnosis of the status of the tool 32 is defined by the subprogram ID. Since different subprogram IDs indicate different processing steps, for example, the model numbers "1" and "2" illustrated in FIG. 5 result in significantly different processing loads as illustrated in FIG. 6, despite of the tools 32 of the same type. If a single model includes such cases of different subprogram IDs, the history of the index value does not show a tendency like that illustrated in FIG. 7 and cannot contribute to determination of an appropriate threshold and estimation of a replacement timing of the tool 32. In contrast, the model according to the present embodiment is identified by the subprogram ID, so that the history of the index value for each model can contribute to determination of an appropriate threshold and estimation of a replacement timing of the tool 32.

The diagnostic apparatus 10 executes diagnosis and estimation based on the index values, which are statistics of processing loads. An instantaneous value of processing load in real time is effective to detect an event, such as breakage of the tool 32, which requires immediate stop of the working machine 30. In general, however, the processing load applied by even a useful tool 32 may momentarily vary to some extent. The tendency like that illustrated in FIG. 7 can therefore be effective to determine the remaining life of the tool 32. The diagnostic apparatus 10 according to the embodiment is therefore capable of effective diagnosis and estimation based on the index values.

FIG. 5 reveals that tools 32 of the same type may be applied in different subprograms 31 in a single working machine 30 in some cases. Most systems in a general field provided with the working machines 30 set a process involving processing steps achieved by different subprograms 31 in the predetermined order, and repeat this process. For example, the tool 32 may wear after execution of a first subprogram 31 and then further wear after execution of a second subprogram 31. These two subprograms 31 are alternately repeated, so that histories of the index values for the models corresponding to the respective subprograms 31 each show a tendency like that illustrated in FIG. 7. The diagnosis at the diagnoser 160 and the estimation at the estimator 180 can therefore be executed as in the above description even in the case where tools 32 of the same type are applied in different subprograms 31.

Embodiment 2

Figure 11:
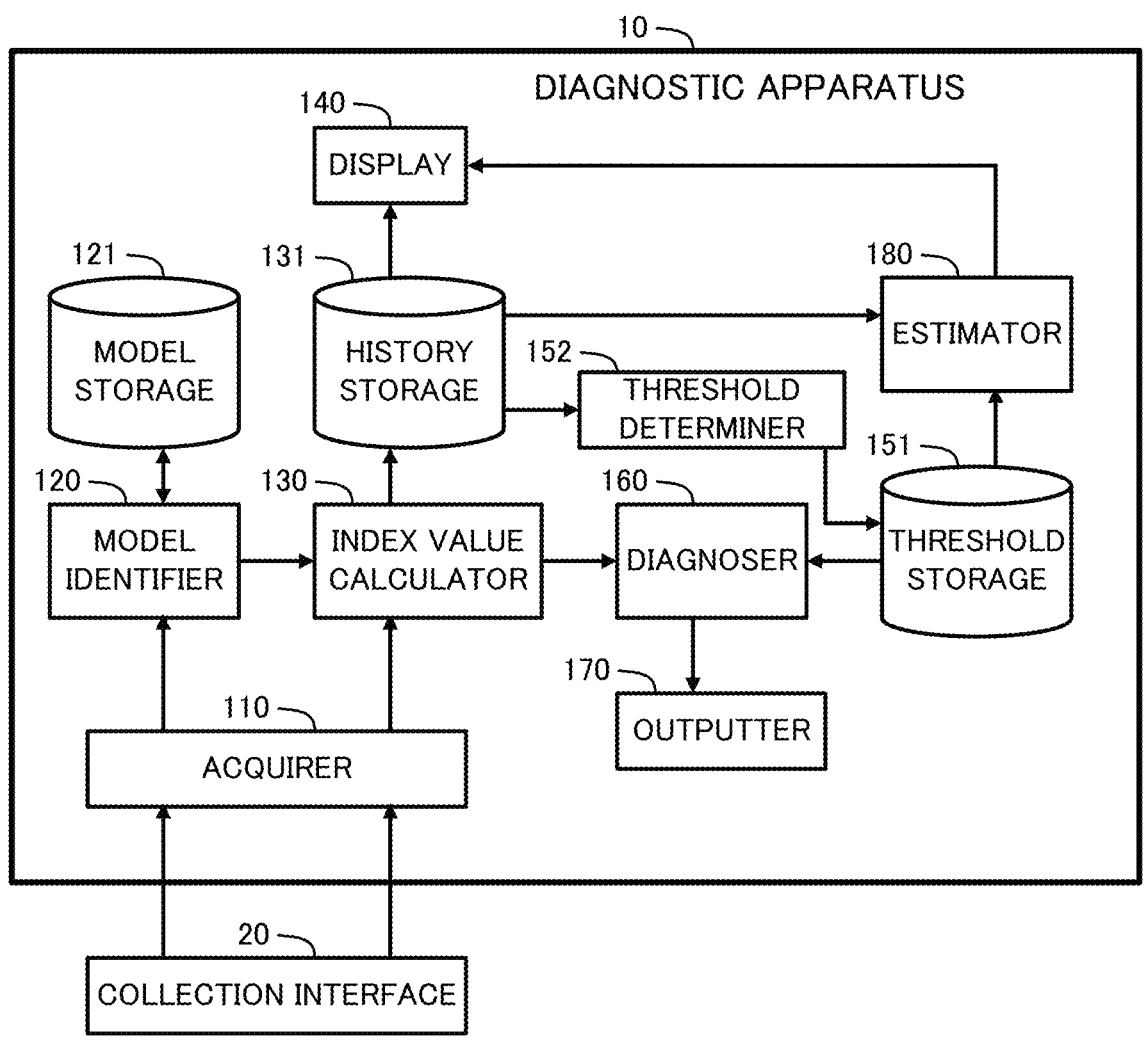
FIG. 11 illustrates a configuration of a diagnostic apparatus according to Embodiment 2.

Embodiment 2 is described below focusing on the differences from Embodiment 1 described above. The components identical or corresponding to those in Embodiment 1 are provided with the same reference symbol without redundant description or with simplified description. Embodiment 2 differs from Embodiment 1 in that the diagnostic apparatus 10 includes a threshold determiner 152, as illustrated in FIG. 11, instead of the receiver 150.

The threshold determiner 152 is mainly achieved by the processor 11. The threshold determiner 152 reads a history of the index value calculated for each model from the history storage 131, calculates a threshold for this model from the read history, and causes the calculated threshold to be stored into the threshold storage 151. In detail, the threshold determiner 152 calculates a threshold D represented by Expression (1) below:

$$D = \mu + C\sigma \quad (1)$$

where $\mu$ indicates the average of the index values contained in the history, $\sigma$ indicates a standard deviation of the index values, and C indicates a coefficient of at least 1.5 and at most 2.0.

Figure 12:
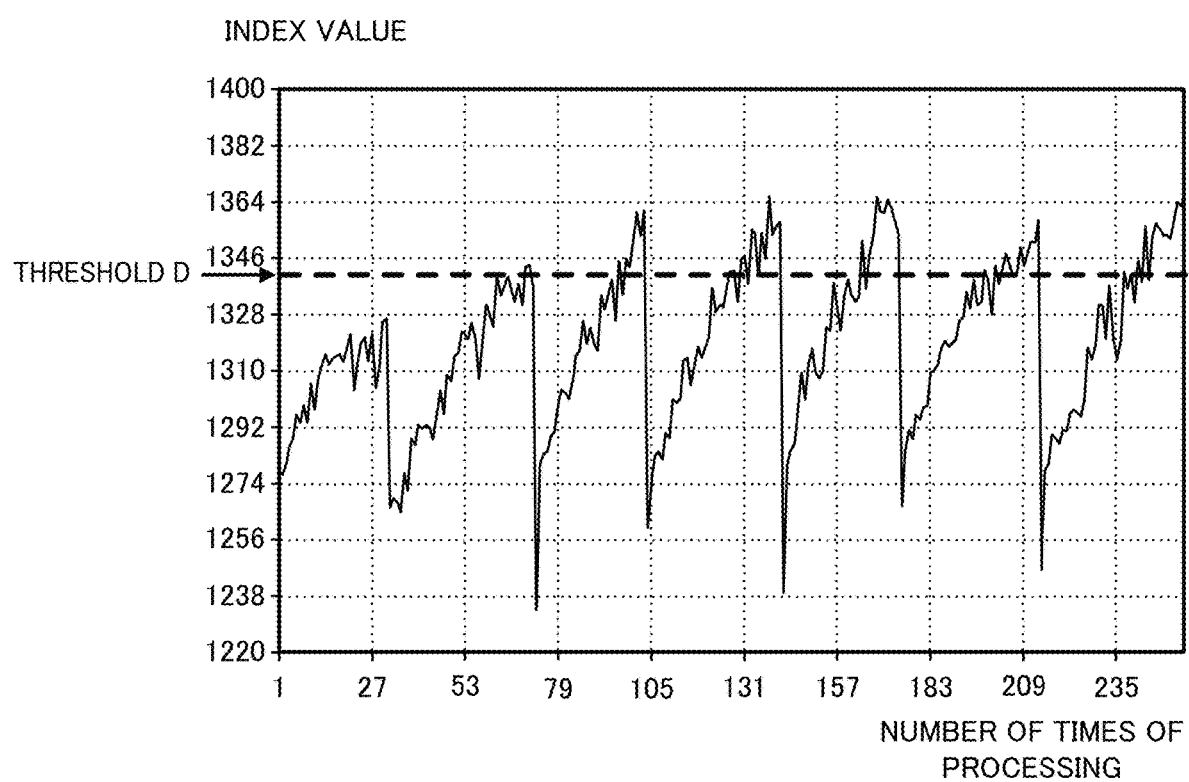
FIG. 12 illustrates a threshold determined at a threshold determiner according to Embodiment 2.

FIG. 12 illustrates an example of the threshold D calculated in accordance with Expression (1) with a dashed line. As is apparent from FIG. 12, the threshold D indicates that the index value has become higher and implies the need for replacement of the tool.

FIG. 12 also reveals that the threshold determiner 152 cannot readily determine an effective threshold in the case where the amount of the accumulated history of the index value is not sufficient. Accordingly, the threshold determiner 152 may determine a threshold when the amount of history of the index value exceeds a certain amount, and otherwise the threshold received at the receiver 150 as in Embodiment 1 may be temporarily applied. The certain amount of history sufficient for determination of the threshold in the threshold determiner 152 preferably contains index values at least from the start of application of the tool 32 until the end due to replacement, more preferably is a history subject to multiple replacements of the tools 32 so as to average the individual differences of the tools 32.

As described above, the threshold used in the diagnoser 160 is determined based on the history of the index value. The user thus does not have to determine the threshold.

The above-described embodiments of the present disclosure are not to be construed as limiting the scope of the present disclosure.

For example, although the index value indicates an amount of load and becomes higher with an increase in the load in the above-described embodiments, this configuration is a mere example. The index value may become lower with an increase in the load. The index value is any value that enables distinguishing a normal state of the tool 32 in which the tool 32 is still useful from an abnormal state of the tool 32 in which the tool 32 needs replacement. That is, the index value is any value belonging to either of the normal range corresponding to the normal state and the ranges corresponding to the abnormal states and out of the normal range.

The diagnoser 160 according to the above-described embodiments thus corresponds to an example of diagnostic means, in the diagnostic apparatus 10, for diagnosing whether an index value of the load that is obtained from the transition information is out of a predetermined range corresponding to a combination of the program identification information, the tool information, and the machine information identifying the working machine that transmits the transition information. The estimator 180 according to the above-described embodiments corresponds to an example of estimation means, in the diagnostic apparatus 10, for estimating, for at least one model of the models, based on the history for the at least one model, how many more times the tool of the type indicated by the tool information is to be used until the index value goes out of the predetermined range. Step S17 in FIG. 10 corresponds to an exemplary step, in the diagnostic method executed in the diagnostic apparatus 10, of diagnosing whether an index value of the load that is obtained from the transition information is out of a predetermined range corresponding to a combination of the program identification information, the tool information, and the machine information. Furthermore, in Embodiment 2, the threshold determiner 152 determines the range corresponding to the model to be smaller than the threshold D, based on the index values contained in the history for this model.

Although a single threshold is determined for each model in the above-described embodiments, this configuration is a mere example. For example, a first threshold for prompting the user to prepare a spare tool 32 and a second threshold for strongly recommending the user to immediately replace the tool 32 may be determined for each model. The diagnoser 160 may execute diagnosis for both of the two thresholds, and the estimator 180 may execute estimation for both of the two thresholds. Alternatively, three or more thresholds may be determined for each model.

Although the above-described embodiments are directed to an example in which the index value is the average value of load and may be replaced with another value, multiple types of index value may also be applied. For example, a first index value, which is the average value of load, and a second index value, which is the median value of load, may be calculated from transition of the processing load. The user may be prompted to prepare a spare tool 32 when either of the two index values exceeds a threshold, and strongly recommended to immediately replace the tool 32 when both of the two index values exceed the threshold. Alternatively, different thresholds may be determined against the two index values.

Although the above-described embodiments are directed to an example in which a single tool 32 is applied in the subprogram 31, this configuration is a mere example. The subprogram 31 using multiple tools 32 may also be executed. In this case, the diagnoser 160 may execute diagnose for multiple models, defined by the tool IDs indicating the respective tools 32 in addition to the machine ID of the working machine executing this subprogram 31 and the subprogram ID of the subprogram 31, in sequence or in parallel. The estimator 180 may also execute estimation for multiple models.

The processing condition information may contain additional information on processing conditions, as well as the machine ID, the subprogram ID, and the tool ID. The additional information on processing conditions is a main program number or S code indicating a rotational speed of the main shaft, for example.

The functions of the diagnostic apparatus 10 may be achieved by dedicated hardware or an ordinal computer system.

For example, the program P1 to be executed at the processor 11 may be stored in a non-transitory computer-readable recording medium for distribution and then installed in a computer to configure an apparatus for performing the above-described processes. Conceivable examples of such a non-transitory recording medium include a flexible disk, a compact disc read-only memory (CD-ROM), a digital versatile disc (DVD), and a magneto-optical disc (MO).

The program P1 may also be stored in a disk drive included in a server apparatus on a communication network, represented by the Internet, and may be downloaded into a computer by being superimposed on a carrier wave, for example.

Alternatively, the program P1 may be activated while being transferred through a communication network to perform the above-described processes.

A server apparatus may execute all or part of the program P1 and a computer may execute the program P1 while transmitting and receiving information on the executed processes to and from the server apparatus via a communication network, to perform the above-described processes.

In the case where the above-described functions are achieved by an operating system (OS) or by cooperation of the OS and applications, only the components other than the OS may be stored in a non-transitory medium for distribution or downloaded into a computer, for example.

The functions of the diagnostic apparatus 10 may also be performed by means other than software. Part or all of the functions may be performed by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for management of working machines.

REFERENCE SIGNS LIST

100 Diagnostic system
10 Diagnostic apparatus
11 Processor
12 Main storage
13 Auxiliary storage
14 Inputter
15 Outputter
16 Communicator
17 Internal bus
110 Acquirer
120 Model identifier
121 Model storage
130 Index value calculator
131 History storage
140 Display
150 Receiver
151 Threshold storage
152 Threshold determiner
160 Diagnoser
170 Outputter
180 Estimator
20 Collection interface
30 Working machine
31 Subprogram
32 Tool
40 Processing target
L1 Line
L2 Regression line
P1 Program

The invention claimed is:

1. A diagnostic apparatus to diagnose existence of an abnormality in a tool for processing of a processing target by each of a plurality of working machines, the diagnostic apparatus comprising:
processing circuitry configured as an acquirer to acquire program identification information, tool information, and transition information at execution of processing by each of the plurality of working machines, the program identification information identifying a program executed in the working machine, the tool information indicating a type of the tool applied to the processing, the transition information indicating transition of load in the working machine from a start to an end of the processing executed by execution of the program;
the processing circuitry further configured as a diagnoser to diagnose whether an index value of the load is out of a predetermined range corresponding to a combination of the program identification information, the tool information, and machine information identifying the working machine that transmits the transition information, the index value being obtained from the transition information; and
the processing circuitry is further configured as an estimator to estimate, for at least one model of models that each are defined by the combination of the program identification information, the tool information, and the machine information, how many more times the tool of the type indicated by the tool information is to be used until the index value goes out of the range based on a history of the index value for the at least one model.

2. The diagnostic apparatus according to claim 1, further comprising:
a storage memory to store the history of the index value for the model, the history containing a plurality of the index values for the model.

3. The diagnostic apparatus according to claim 2, wherein the range is determined based on the plurality of index values contained in the history for the model corresponding to the range.

4. The diagnostic apparatus according to claim 3, wherein the index value indicates an amount of the load, and the range is smaller than a threshold D represented by an expression below:

$$D=\mu+C\sigma$$

where $\mu$ indicates an average of the plurality of index values contained in the history for the model corresponding to the range, $\sigma$ indicates a standard deviation of the plurality of index values, and C indicates a coefficient of at least 1.5 and at most 2.0.

5. The diagnostic apparatus according to claim 1, wherein the index value is an average of the load, a median value of the load, a maximum value of the load, or a minimum value of the load.

6. A diagnostic method for diagnosing existence of an abnormality in a tool for processing of a processing target by each of a plurality of working machines, the diagnostic method comprising:

acquiring, by an acquirer, program identification information, tool information, and transition information at execution of processing by each of the plurality of working machines, the program identification information identifying a program executed in the working machine, the tool information indicating a type of the tool applied to the processing, the transition information indicating transition of load in the working machine in the processing;

diagnosing, by a diagnoser, whether an index value of the load is out of a predetermined range corresponding to a combination of the program identification information, the tool information, and machine information identifying the working machine that transmits the transition information, the index value being obtained from the transition information; and estimating, for at least one model of models that each are defined by the combination of the program identification information, the tool information, and the machine information, how many more times the tool of the type indicated by the tool information is to be used until the index value goes out of the range based on a history of the index value for the at least one model.

7. A non-transitory recording medium storing a program designed for a computer to diagnose existence of an abnormality in a tool for processing of a processing target by each of a plurality of working machines, the program causing the computer to function as:

an acquirer to acquire program identification information, tool information, and transition information at execution of processing by each of the plurality of working machines, the program identification information identifying a processing program executed in the working machine, the tool information indicating a type of the tool applied to the processing, the transition information indicating transition of load in the working machine in the processing;

a diagnoser to diagnose whether an index value of the load is out of a predetermined range corresponding to a combination of the program identification information, the tool information, and machine information identifying the working machine that transmits the transition information, the index value being obtained from the transition information; and an estimator to estimate, for at least one model of models that each are defined by the combination of the program identification information, the tool information, and the machine information, how many more times the tool of the type indicated by the tool information is to be used until the index value goes out of the range based on a history of the index value for the at least one model.

* * * * *